INVENTOR.
LEONARD R. RUBIN

United States Patent Office 3,398,504
Patented Aug. 27, 1968

3,398,504
METHOD OF TRANSPORTING HYDROGEN AND APPARATUS THEREFOR
Leonard R. Rubin, Union, N.J., assignor to Engelhard Industries, Inc., Newark, N.J., a corporation of Delaware
Filed Mar. 7, 1967, Ser. No. 621,307
15 Claims. (Cl. 55—16)

ABSTRACT OF THE DISCLOSURE

This disclosure relates to a method for purifying hydrogen by use of palladium and palladium alloys. These metals are used in transportation and purification of hydrogen by virtue of their ability to absorb and desorb gas. The pure hydrogen gases are normally obtained from a mixture of gases containing hydrogen by contacting said mixture with the palladium or palladium alloy. Absorption then takes place followed by desorption of the hydrogen into a site different from the one in which the hydrogen was initially absorbed.

BACKGROUND OF THE INVENTION

This invention pertains to a method for transporting hydrogen. More particularly, it is concerned with a method for transporting hydrogen from a site where it may be present in a gaseous mixture to a second location where it is present in relatively pure form. Still more particularly, the invention concerns a process for purifying hydrogen and apparatus therefor.

Methods for purifying hydrogen by diffusion through nonporous solids selectively permeable to hydrogen are well known. Palladium and palladium alloys are preferred hydrogen permeable metals used in many devices for obtaining pure hydrogen. In such devices the palladium metals are used as a barrier between a crude hydrogen containing stream and the pure hydrogen downstream. In order to achieve satisfactory commercial rates of diffusion, exceedingly thin palladium elements must be used, a large surface area of palladium must be available, and the devices must be operated at elevated temperatures and with a high differential in hydrogen pressure across the barrier. The integrity of the thin palladium barrier between the crude upstream and pure hydrogen must be of the highest order. Any pores in the thin palladium will immediately result in decreased purity of the product. The palladium must remain pore free and must be of the highest quality possible. Leaks in a system can develop from minute defects introduced at some stage in the manufacture and these imperfections may show up only during use. Fabrication of palladium, usually used as foil of the order of 1 mil thickness or tubing of about 3 or 4 mils thickness, which will satisfy the integrity demands of such devices is very difficult and very costly. Additional problems of supporting the thin palladium septa and/or sealing the palladium barriers for use in the severe operating conditions are well known.

SUMMARY OF INVENTION

This invention involves a novel and unique method using palladium metals for the purification of hydrogen. In accordance with this method, hydrogen is absorbed by palladium from a crude stream containing hydrogen and such palladium is moved to a separate site where the hydrogen is desorbed giving a pure hydrogen product. There is no hydrogen permeable barrier separating the crude stream from the pure hydrogen. In a preferred embodiment of this invention, there is no wall with a seal common to the crude and pure hydrogen streams. In an important adaptation of this process, it may be employed to deliver hydrogen at a pressure higher than in the feed.

The present method for transporting and purifying hydrogen involves the use of several steps. First, the hydrogen is absorbed at an operating temperature on palladium or a palladium alloy, said metal being present in a site, chamber, location or enclosure (first atmosphere) in the presence of hydrogen or a gaseous mixture containing hydrogen. After sufficient time is allowed for the metal to absorb the hydrogen under the conditions involved, it is transported to a second site (second atmosphere) wherein desorption of the hydrogen is made to take place. The invention accordingly concerns a process for transporting pure hydrogen from one location to another by introducing the hydrogen absorbing metal to a site where the hydrogen is absorbed, transporting the metal having the hydrogen absorbed therein to a second site, and causing desorption of the pure hydrogen therefrom.

It is an object of the present invention to provide a method for continuously transporting hydrogen from one site to another. It is a further object of the invention to provide a means for purifying hydrogen. A still further object concerns provision of a method for purifying hydrogen which avoids the use of a wall separating the pure from the crude gas. Still another object is provision of a means for transporting hydrogen from a low pressure to a high pressure area. Further objects will be apparent from the following description of the invention.

DESCRIPTION OF PREFERRED EMBODIMENTS

In accordance with the present invention it has now been found that hydrogen may be transported or purified by use of a method or device utilizing a hydrogen-absorbing material, such as palladium or palladium alloy, which absorbs and desorbs hydrogen at different sites (i.e., areas, chambers or enclosures), said sites not being separated by the hydrogen-absorbing material. The method and apparatus of the present invention accordingly provide a novel means for transporting and purifying hydrogen which does not rely for effectiveness upon the integrity of the hydrogen-absorbing metal used. The extremely rigid requirements for palladium or palladium alloy tubes, foil, and the like and the high cost in obtaining such diffusion devices are accordingly obviated by the present invention.

The first site or location of this invention which will also be called a first atmosphere, may comprise an area, enclosure, an absorption chamber and the like. A gaseous mixture comprising hydrogen is present at this location and is preferably fed there continuously. The hydrogen-absorbing material which hereafter will be called the alloy, is passed through this first atmosphere with sufficient time being given to allow the hydrogen to be adequately absorbed. The time necessary for adequate or complete absorption may be decreased by increasing the temperature of the alloy. This is preferably accomplished by the use of a furnace or other heating means which may raise the temperature of the hydrogen absorbing alloy to 100–900° C. Although more hydrogen is absorbed at the lower temperature, the rate of absorption at this temperature is quite slow. On the other hand, the rate of hydrogen absorption at 900° C. is extremely rapid although the solubility of hydrogen in the alloy is low in comparison with the amount of hydrogen which theoretically could be absorbed at substantially lower temperatures. Moreover, this upper limit represents that temperature at which the means for transporting the absorbing material from one site to another is substantially less reliable. It is preferred that the temperature of the absorbing material be 300°–500° C. in this absorption chamber.

The palladium or palladium alloy is transported to a desorption chamber or second atmosphere by any convenient method. One of the methods which may be used involves utilization of pressurized fluid to force particles of the alloy to the second location, much as a fluidized bed would operate. Other means for transporting the alloy involve mechanically driving one or more continuous bands of a hydrogen absorbing material, for example, in the form of strips, wires, belts, or the like of same. It should be understood, however, that the alloy itself need not be the continuous material mentioned and the alloy may be embedded in or coated on another metal or nonmetal, such as asbestos, which itself would be a continuous strip, wire, belt, etc. For convenience, this type of configuration of the alloy will hereafter be called a wire but it is not intended that so doing limit the nature of the invention. A suitable driving device for the wire will include a simple motor which is preferably connected to variable gears to permit ready modification in the speed of the wire.

The second necessary site or atmosphere according to this invention is the hydrogen desorption chamber wherein the alloy emits the pure hydrogen. The temperature of the wire at this second location may again be about 100° to 900° C. but is preferably from about 600° C. to about 800° C. The hydrogen desorbed at this desorption chamber may optionally be stored or transported to a further location where it might be immediately utilized.

In a preferred embodiment of the present invention, the hydrogen-absorbing material is in the form of a strip, wire or belt of palladium or palladium alloy. Suitable palladium alloys useful in this regard are palladium-silver, palladium-boron, and palladium-gold. A particularly suitable alloy contains, by weight, Pd–75% and Ag–25%.

When properly arranged, it will be seen that the palladium alloy wire will pass from the hydrogen absorption site to the hydrogen desorption site quite readily. When appropriate pressure and temperature conditions are established in each of the locations, the system provides a useful and efficient method (1) for transporting hydrogen from the absorption to the desorption site, or
(2) for purifying hydrogen.

When it is intended that a system for purifying hydrogen be arranged, it will be of some benefit to provide for relatively high pressure at the absorption location and relatively high temperature at the desorption site. These two areas are conveniently referred to as a crude gas chamber and a product gas chamber, respectively, when a purification system is desired.

Generally, respective pressures of the absorption and desorption site are not critical except that the pressure and the temperatures used in conjunction therewith should be such that a lesser quantity of hydrogen can be retained by the alloy at the second location. It is accordingly possible, by virtue of manipulating temperature alone, to provide hydrogen at a greater delivery pressure at the desorption site than the $H_2$ pressure of the feed. When this is done, an embodiment of present invention is provided which may be called a "hydrogen pump." For example, hydrogen absorbed at one site at 300° C. and 15 p.s.i.g. may be emitted from the alloy at a second site at 700° C. at much higher pressure.

Although not essential, the preferred embodiments of this invention have no wall and seal common to the crude and pure streams. This minimizes contamination of hydrogen by the crude and permits the use of seals under less severe operating conditions.

The seals which are useful in preventing or minimizing leakage from each location may be made from any suitable material. They may be either a liquid or a solid such as nylon, Teflon (polytetrafluoroethylene), or carbon or asbestos packing. Although not essential to the operation of this process, it is preferred, particularly when high absorption and desorption temperatures are used, to cool the wire before it passes through the seals. This may be accomplished by fluid cooling such as water quenching or by contacting the wire with a suitable conductor of heat, e.g., a metal.

It is generally desirable to assist in prolonging the life of solid seals used according to the present invention by cooling the wire before its passage through the seals. Some absorption of hydrogen takes place in the alloy during this cooling and, in the absorption chamber, this provides added proficiency to this invention. However, when the hydrogen pump embodiment is desired, this cooling should be as rapid as possible in the second atmosphere to avoid significant reabsorption. When rapid cooling is effected, the rate at which the hydrogen will be reabsorbed will be so small that the wire will pass out of the desorption chamber before substantial reabsorption can take place.

The present invention provides a highly efficient system for hydrogen removal. This is so because fresh alloy substantially devoid of hydrogen may constantly be passed into the absorption or crude gas chamber. Virtually complete removal of hydrogen from the first site may accordingly take place. This degree of efficiency is impossible in standard hydrogen purification systems where there is always some hydrogen back-pressure from the permeation system.

It should be understood that the term pure hydrogen means hydrogen containing minimal amounts of impurities, for instance, less than 0.1% of impurities and usually less than 0.01% of impurities.

BRIEF DESCRIPTION OF THE DRAWINGS

Referring to the accompanying drawings, preferred embodiments of the devices of the present invention are shown in which:

In FIGURE 1 there is shown an embodiment of the present invention in which the absorption area 1 (also conveniently called a crude chamber) is heated by a furnace 2 which causes an increase in temperature of the palladium alloy wire 3 within the crude chamber 1. This chamber 1 is fitted with an inlet 4 for crude gas and an outlet 5 for bleed gas. The wire 3 passes into the absorption area through seal 6 and exits said area through seal 7. The alloy wire 3 then enters the product chamber (desorption area) 8 through seal 9 and its temperature is raised by furnace 10. The wire 3 then emits pure hydrogen in chamber 8. The pure hydrogen may be withdrawn from the product chamber 8 through exit 11. The alloy wire leaves the product chamber 8 through seal 12 and, in a preferred embodiment, is returned again directly to seal 6 for prompt passage back into the crude chamber. The quantity of pure gas leaving exit 11 may be measured by a flow meter (not shown). The alloy wire can be transported through the system by use of a driving means such as variable speed drive 13 which may be located between seals 12 and 6.

FIGURE 2 is an embodiment of the present invention which permits the delivering of hydrogen to the second site at a pressure higher than that in the absorption area.

Figure 1:
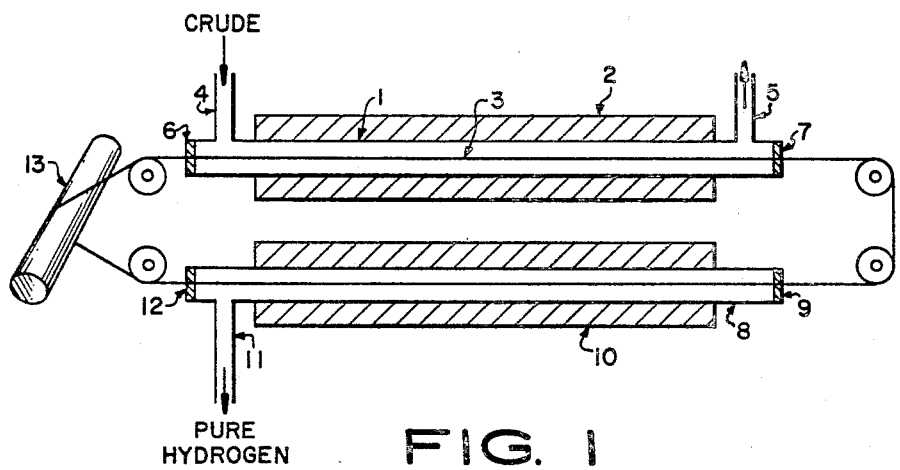
FIGURE 1 is a schematic view of apparatus useful in providing the desired hydrogen transportation or purification.

The hydrogen entering the chamber 14 would be at a relatively low pressure. Pure hydrogen is absorbed on the alloy wire 15 and transported into the chamber 16 where it is desorbed, normally at a pressure several times greater than the pressure in the absorption area 14. It is then preferably quickly cooled by virtue of some cooling device 17 and passed out of the desorption chamber 16.

The following examples are provided for the purpose of illustration and not by way of limitation.

*Example I*

Figure 3:
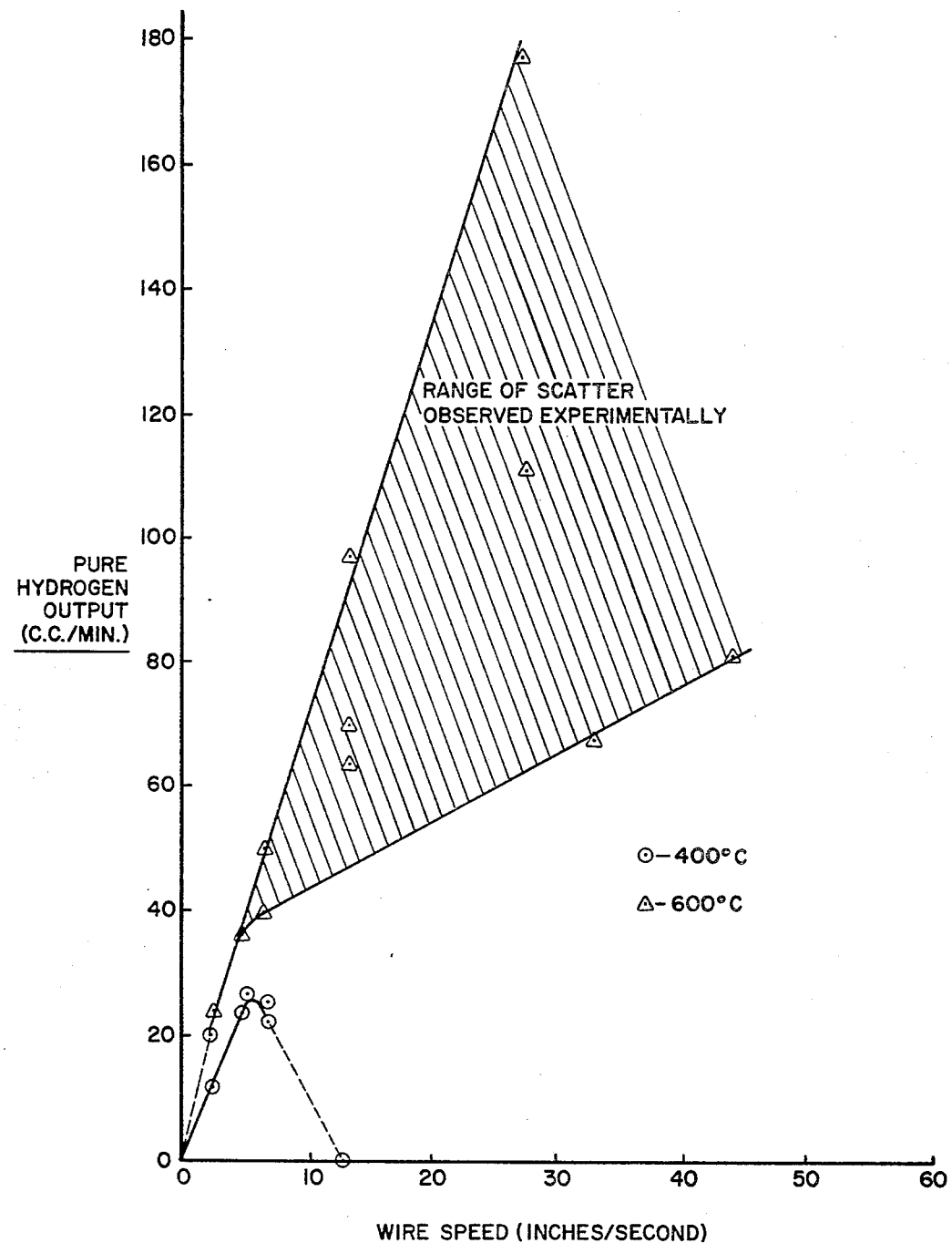
FIGURE 3 represents plots showing the relationship between the speed of the wire passing through the chambers and the amount of pure hydrogen emitted in the desorption chamber for the system described in Example I. Larger systems will have larger flows and different wire speeds.

Utilizing a device similar to that depicted by FIGURE 1, the method of this invention is carried out by transporting hydrogen from the crude gas chamber (first atmosphere) to the product gas chamber (second atmosphere) by dissolving the hydrogen into a palladium alloy wire in the crude gas chamber and removing the hydrogen-charged palladium alloy from the crude chamber and transporting it into a separate product chamber. The hydrogen is desorbed in the second chamber. Both sites and the palladium wire therein are heated to about 400° C. The hydrogen pressure at the absorption site is 150 p.s.i.g. The pressure in the product chamber is 1 atmosphere. The rate of hydrogen product obtained is measured. The speed of the wire, and accordingly the length of time the wire remained in the crude gas chamber is varied. The palladium wire is 6 mils in diameter and is made by Engelhard Industries, Inc. It is identified as EI 349 wire and contains 75 weight percent of palladium and 25 weight percent of silver. Table I and FIGURE 3 derived therefrom indicate the results obtained.

TABLE I

| T. (° C.) | Wire Speed (in./sec.) | Time of stay (in 10″ hot zone) (sec.) | Pure Flow (cc./min.) |
|---|---|---|---|
| 400 | 3 | 3.3 | 19.5 |
|  | 3 | 3.3 | 12.5 |
|  | 5 | 2.0 | 25.9 |
|  | 5 | 2.0 | 24.6 |
|  | 5 | 2.0 | 25.2 |
|  | 7.3 | 1.4 | 21.4 |
|  | 7.3 | 1.4 | 25.0 |
|  | 13.6 | 0.73 | 0 |
| 600 | 5 | 2.0 | 35.7 |
|  | 7.3 | 1.4 | 39.5 |
|  | 13.6 | 0.73 | 64 |
|  | 7.3 | 1.4 | 50 |
|  | 13.6 | 0.73 | 70 |
|  | 13.6 | 0.73 | 97* |
|  | 27 | 0.37 | 176 |
|  | 3 | 3.3 | 24.4 |
|  | 27 | 0.37 | 111 |
|  | 33 | 0.30 | 67 |
|  | 44 | 0.23 | 81 |

The data marked with an asterisk is used to calculate and to compare the relative volumes of precious metal required in this system with that required in a present art commercial system to produce 97 cc./min. Note that no attempt is made to optimize the temperature relationships between the crude and product chambers in this test. It is found that the volume of precious metal required using 6 mil wire under the conditions specified above is the same order of magnitude as that required in a commercial unit using 4 mil wall 0.125 dia. tubing at 450° C. with 150 p.s.i.g. $H_2$ upstream and 1 atmosphere downstream. Wire is cheaper on an ounce per ounce basis than permeation grade tubing and, as indicated above, the quality requirements of the wire are substantially less than for the tubing. The wire need only have enough "integrity" to keep it from breaking as it is pulled through the system. It is obvious that this present transport process becomes increasingly attractive as the size of the units, and therefore the precious metal requirements, increases.

Figure 2:
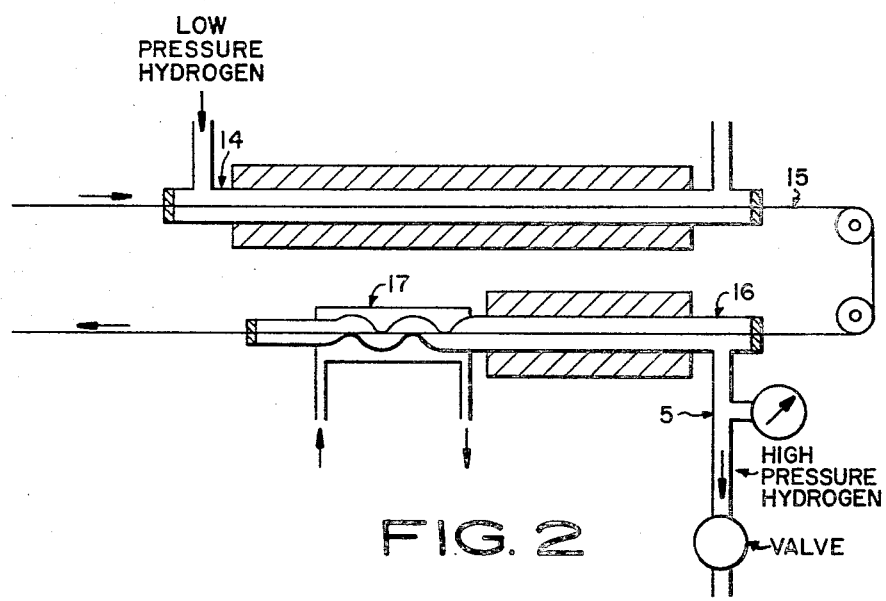
FIGURE 2 is a schematic view of an embodiment which may be called a hydrogen pump since it supplies hydrogen to the second site or enclosure at a pressure higher than the hydrogen pressure present at the first site.

Using the apparatus schematically shown in FIGURE 2, and with the crude gas mixture entering the absorption chamber at about 17 p.s.i.a. (hydrogen pressure), attempt is made to provide the description chamber with hydrogen at a pressure higher than that in the absorption chamber. The crude gas furnace and the palladium alloy within the absorption chamber are at a temperature of about 400° C. The wire in the product chamber is heated to about 700° C. A pressure of about 50 p.s.i.a. hydrogen is measured in the product chamber. The wire in the product chamber is rapidly cooled after the heating to 700° C. to avoid reabsorption of hydrogen. This is accomplished by water cooling portion of the product chamber and causing wire wire to contact the walls thereof.

It should be understood that although this invention has been described with reference to particular embodiments thereof, changes and modifications may be made which are within its intended scope, and it should be limited only by the language of the appended claims.

What is claimed is:

1. A process for transporting pure hydrogen from one location having a gas containing hydrogen, which comprises introducing a continuous band of hydrogen absorbing material comprising palladium or palladium alloy into a first atmosphere comprising a gas containing hydrogen, absorbing hydrogen into the hydrogen absorbing material, transporting the band of hydrogen absorbing material out of said first atmosphere and, in a second atmosphere, heating said hydrogen absorbing material to cause desorption of pure hydrogen therefrom.

2. A process according to claim 1 in which the hydrogen absorbing material is heated within the first atmosphere.

3. A process according to claim 2 in which the hydrogen absorbing material is a palladium alloy.

4. A process according to claim 3 in which the hydrogen absorbing material is heated in both the first and second atmospheres to a temperature of about 100°–900° C.

5. A process according to claim 4 in which the palladium alloy contains about 75% palladium and about 25% silver, by weight, and such alloy is heated in the first and second atmospheres to temperatures of about 300°–500° C. and 600°–800° C., respectively.

6. A process according to claim 2 in which the second atmosphere has a higher hydrogen pressure than the first atmosphere.

7. A process according to claim 6 in which the hydrogen absorbing material is a palladium alloy which is heated in both the first and second atmospheres to a temperature of about 100°–900° C., and the temperature of the palladium alloy is higher in the second atmosphere than in the first atmosphere.

8. A process according to claim 7 in which the palladium alloy contains, by weight, about 75% palladium and about 25% silver and is heated in the first and second atmospheres to temperatures of about 300°–500° C. and 600°–800° C., respectively.

9. A process according to claim 1 in which the first atmosphere is a gaseous mixture having a pressure greater than about 15 p.s.i.a.

10. Apparatus for transporting pure hydrogen from a gas containing hydrogen, which comprises:
   (a) a first enclosure for retaining a gas containing hydrogen,
   (b) a second enclosure
   (c) a continuous band of hydrogen absorbing material comprising palladium or palladium alloy within the first enclosure,
   (d) means for transporting said band of hydrogen absorbing material from within the first enclosure to within the second enclosure,
   (e) means for heating the hydrogen absorbing material within the second enclosure to cause desorption of pure hydrogen therefrom,
   (f) means for supplying the gas containing hydrogen to the first enclosure, and
   (g) means for withdrawing the pure hydrogen from the second enclosure.

11. Apparatus according to claim 10 in which the means for transporting the hydrogen absorbing material acts by pulling said material from the first enclosure to the second enclosure.

12. Apparatus according to claim 10 in which the continuous band of hydrogen absorbing material is a wire of palladium alloy containing, by weight, 75% palladium and 25% silver.

13. Apparatus according to claim 10 in which means is provided for rapidly cooling the hydrogen absorbing material within the second enclosure.

14. Apparatus according to claim 10 in which the continuous band of hydrogen absorbing material is wire of palladium or palladium alloy.

15. Apparatus according to claim 10 in which the continuous band of hydrogen absorbing material is belting of palladium or palladium alloy.

References Cited
UNITED STATES PATENTS
2,134,544    10/1938    Ashley _____ 55—34 X
2,773,561    12/1956    Hunter _____ 55—16

FOREIGN PATENTS
697,318    11/1964    Canada.

REUBEN FRIEDMAN, *Primary Examiner.*